United States Patent
Adams

[19]

[11] Patent Number: 6,108,174
[45] Date of Patent: Aug. 22, 2000

[54] TUNING ACTUATOR ARM DISPLACEMENT CHARACTERISTICS TO REDUCE DAMAGE FROM MECHANICAL SHOCKS

[75] Inventor: Carl Fred Adams, Yukon, Okla.

[73] Assignee: Seagate Technology, Inc., Scotts Valley, Calif.

[21] Appl. No.: 09/000,804

[22] Filed: Dec. 30, 1997

Related U.S. Application Data

[60] Provisional application No. 60/055,811, Aug. 15, 1997.

[51] Int. Cl.[7] .................................................. G11B 5/48
[52] U.S. Cl. ............................................... 360/266.1
[58] Field of Search ..................................... 360/104–106

[56] References Cited

U.S. PATENT DOCUMENTS

| | | | |
|---|---|---|---|
| 5,349,486 | 9/1994 | Sugimoto et al. | 360/105 |
| 5,404,636 | 4/1995 | Stefansky et al. | 29/603 |
| 5,644,448 | 7/1997 | Suzuki | 360/103 |
| 5,656,877 | 8/1997 | Loubier | 360/104 |
| 5,691,861 | 11/1997 | Ohba | 360/104 |
| 5,815,348 | 9/1998 | Danielson et al. | 360/104 |
| 5,815,350 | 9/1998 | Kennedy et al. | 360/105 |

FOREIGN PATENT DOCUMENTS

| | | | |
|---|---|---|---|
| 3-278382 | 5/1992 | Japan | 360/104 |
| 4-134678 | 5/1992 | Japan | 360/104 |
| 4-134763 | 5/1992 | Japan | 360/104 |

*Primary Examiner*—Allen T. Cao
*Attorney, Agent, or Firm*—Crowe & Dunlevy

[57] ABSTRACT

An apparatus and associated method are described which change the mechanical response characteristics of an actuator arm in a disc drive such that damage to the disc drive resulting from mechanical shock is minimized. An actuator arm is provided which has a groove that extends along a side portion of the actuator arm. A side rail is attached to the side portion of the actuator arm, and is preferably T-shaped so that the side rail mates with the groove. The side rail can be constructed of a stiffening material and/or a damping material as desired to change the mechanical response characteristics of the actuator arm to reduce contact between the actuator arm and the disc surface which results from mechanical shock to the disc drive assembly. In the method of use, a groove is machined into a side portion of an actuator arm and then an actuator arm side rail is inserted into the groove.

10 Claims, 3 Drawing Sheets

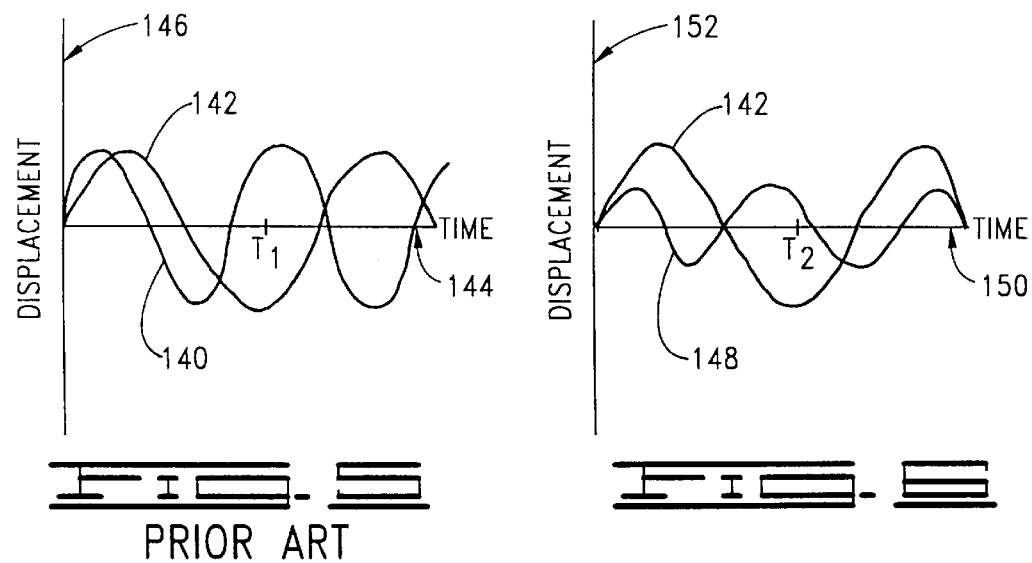
FIG. 5 PRIOR ART
FIG. 6
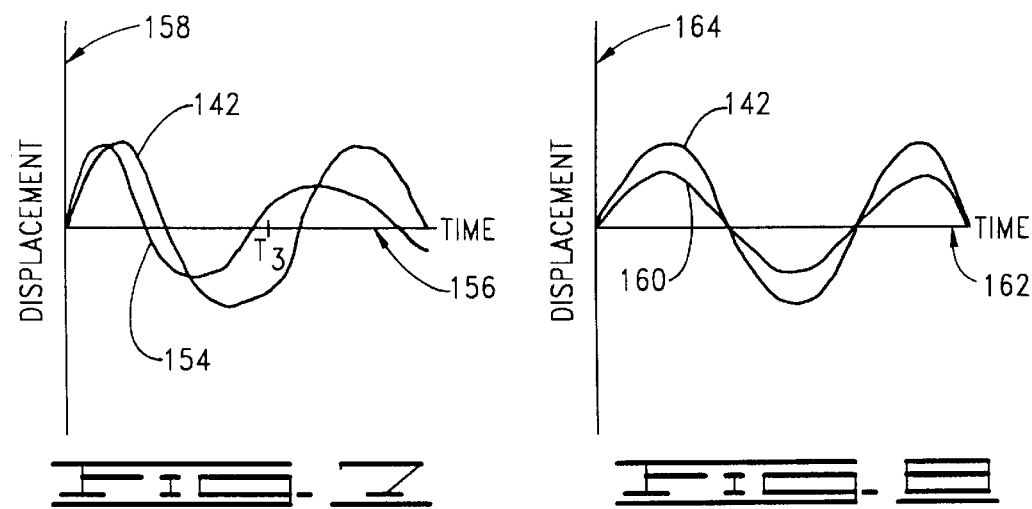
FIG. 7
FIG. 8

TUNING ACTUATOR ARM DISPLACEMENT CHARACTERISTICS TO REDUCE DAMAGE FROM MECHANICAL SHOCKS

RELATED APPLICATIONS

This application claims the benefit of Provisional Application No. 60/055,811 entitled HARD DISC DRIVE ACTUATOR ARM STIFFENER, filed Aug. 15, 1997. This application is related to copending U.S. patent application Ser. No. 09/000,689 entitled DISC DRIVE WITH STREAMLINED ACTUATOR ARMS AND METHOD OF USE THEREFOR filed concurrently herewith and assigned to the assignee of the present invention.

FIELD OF THE INVENTION

This invention relates generally to the field of disc drive storage devices, and more particularly, but not by way of limitation, to reducing the susceptibility of damage in disc drives resulting from non-operating mechanical shocks through the use of an actuator arm side rail.

BACKGROUND OF THE INVENTION

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend generally circumferentially around the discs and store data in the form of magnetic flux transitions within the radial extent of the tracks on the disc surfaces. Typically, each data track is divided into a number of data sectors that store fixed sized data blocks.

A read/write head includes an interactive element such as a magnetic transducer which senses the magnetic transitions on a selected data track to read the data stored on the track, or to transmit an electrical signal that induces magnetic transitions on the selected data track to write data to the track. The head includes a read/write gap that positions the active elements of the head at a position suitable for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head includes a slider assembly having an air bearing surface that causes the head to fly over the data tracks of the disc surface due to air currents caused by rotation of the disc.

Typically, several discs are stacked on top of each other and the surfaces of the stacked discs are accessed by the heads mounted on a complementary stack of actuator arms which comprise an actuator assembly, or "E-block." The E-block generally includes head wires which conduct electrical signals from the heads to a flex circuit, which in turn conducts the electrical signals to a flex circuit bracket mounted to a disc drive basedeck. For a general discussion of E-block assembly techniques, see U.S. Pat. No. 5,404,636 entitled METHOD OF ASSEMBLING A DISK DRIVE ACTUATOR, issued Apr. 11, 1995 to Stefansky et al., assigned to the assignee of the present invention.

As will be recognized, a continuing trend in the industry is the reduction in the size of modern disc drives. As a result, the discs in the disc stacks of modern disc drives are increasingly being brought closer together, providing narrower vertical gaps between adjacent discs. This trend toward decreasing size is driving the industry toward smaller heads, longer and thinner actuator arms, and thinner gimbal assemblies. Although these and other size reductions facilitate greater storage capacity, such narrow vertical spacing of the discs and thinning of the actuator arms gives rise to a problem of increased sensitivity of the disc drives to non-operating mechanical shocks.

Non-operating shock, such as encountered during shipping and handling of disc drives, can often cause the heads or actuator arm tips to contact the media on the discs. When a non-operating shock is encountered, the discs and actuator arms vibrate, causing displacement of the actuator arms and discs in a vertical direction (often referred to in the industry as the "Z-axis"). The discs and actuator arms oscillate about the positions they held prior to encountering the non-operating shock. Because the actuator arms have different characteristics than the discs, the oscillation of the actuator arms occurs at a different frequency than the oscillation of the discs. As a result, the wavefunctions for the oscillations of the actuator arms and discs become out of phase, which means that the actuator arms and discs are moving toward each other. If the amplitude of the displacement is large enough, the heads and perhaps even the tips of the actuator arms contact the discs. The resulting contact can damage the surfaces of the discs, the heads, and the actuator arms and has been recognized as a predominant failure mode in modern disc drives.

Although little can be done to completely eliminate contact between the discs and the heads or actuator arms, it is desirable to reduce the amplitude of the force of impact as well as the number of impacts which are encountered for any given non-operational shock. Thus, there is a need for an improved approach to reducing the susceptibility of damage in disc drives resulting from non-operating mechanical shocks.

SUMMARY OF THE INVENTION

The present invention relates to disc drive actuator arms having an actuator arm side rail for reducing the susceptibility of damage in disc drives resulting from non-operating mechanical shocks.

In accordance with one embodiment of the invention, a method is provided changing the properties of an actuator arm in a disc drive assembly which includes machining a groove in a side portion of the actuator arm and then inserting an actuator arm side rail into the groove on the side of the actuator arm.

The present invention also provides an improved actuator arm assembly for a disc drive. In a preferred embodiment the actuator arm assembly includes an actuator arm having a side portion which extends along a portion of the actuator arm, and a side rail attached to the side portion of the actuator arm for changing mechanical properties of the actuator arm to reduce contact between the actuator arm and the disc surface which results from mechanical shock to the disc drive assembly. In particularly preferred embodiments, the side portion of the actuator arm includes a groove which extends along a portion of the actuator arm and the side rail is elongated and substantially T-shaped so that the side rail mates with the groove on the side portion of the actuator arm.

These and various other features as well as advantages which characterize the present invention will be apparent from a reading of the following detailed description and a review of the associated drawings.

BRIEF DESCRIPTION OF THE DRAWINGS

FIG. 5 is a graphical representation of wavefunctions for the oscillation of the discs and prior art actuator arms upon encountering a typical non-operational shock.

FIG. 6 is a graphical representation of wavefunctions for the oscillation of the discs and actuator arms constructed in accordance with the present invention and having an actuator arm side rail comprised of a stiffening material.

FIG. 7 is a graphical representation of wavefunctions for the oscillation of the discs and actuator arms constructed in accordance with the present invention and having an actuator arm side rail comprised of a damping material.

FIG. 8 is a graphical representation of wavefunctions for the oscillation of the discs and actuator arms constructed in accordance with the present invention wherein the actuator arms have been tuned to the frequency of the discs.

DETAILED DESCRIPTION

Figure 1:
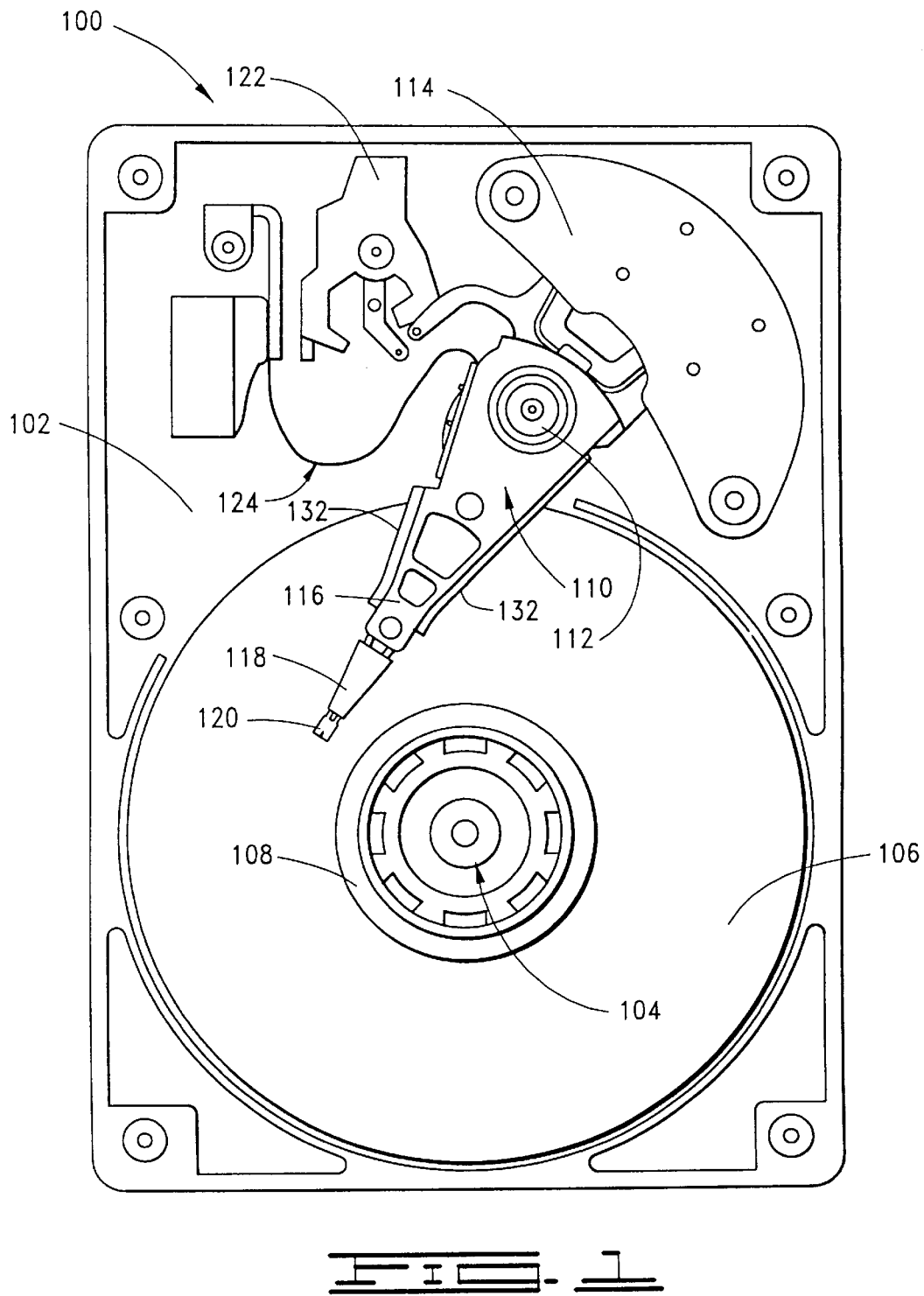
FIG. 1 is a top plan view of a disc drive in which a preferred embodiment of the present invention is particularly useful.

Turning now to the drawings and more particularly to FIG. 1, shown therein is a top plan view of a disc drive 100 constructed in accordance with a preferred embodiment of the present invention. The disc drive 100 includes a base deck 102 to which various components of the disc drive 100 are mounted. A top cover, which has been omitted from FIG. 1 to facilitate the present discussion, cooperates with the base deck 102 to form an internal, sealed environment for the disc drive.

A spindle motor 104 is provided to rotate a stack of discs 106 at a constant high speed. A disc clamp 108 secures the discs 106 to a hub (not separately designated) of the spindle motor 104.

To transfer data to and from the discs 106, a controllably positionable actuator assembly 110 is provided which rotates about a cartridge bearing assembly 112 in response to currents applied to a coil (not separately designated) of a voice coil motor (VCM) 114. The actuator assembly 110 includes a plurality of actuator arms 116 from which corresponding flexure assemblies 118 extend. Heads 120 are provided at distal ends of the flexure assemblies 118 and are supported over the discs 106 by air bearings established by air currents set up by the rotation of the discs 106. A latch assembly 122 is provided to secure the heads 120 over landing zones at the innermost diameters of the discs 106 when the disc drive 100 is deactivated. A flex circuit assembly 124 provides electrical communication paths between the actuator assembly 110 and a disc drive printed circuit board (not shown in FIG. 1) mounted to the underside of the disc drive 100 in a conventional manner.

Figure 2:
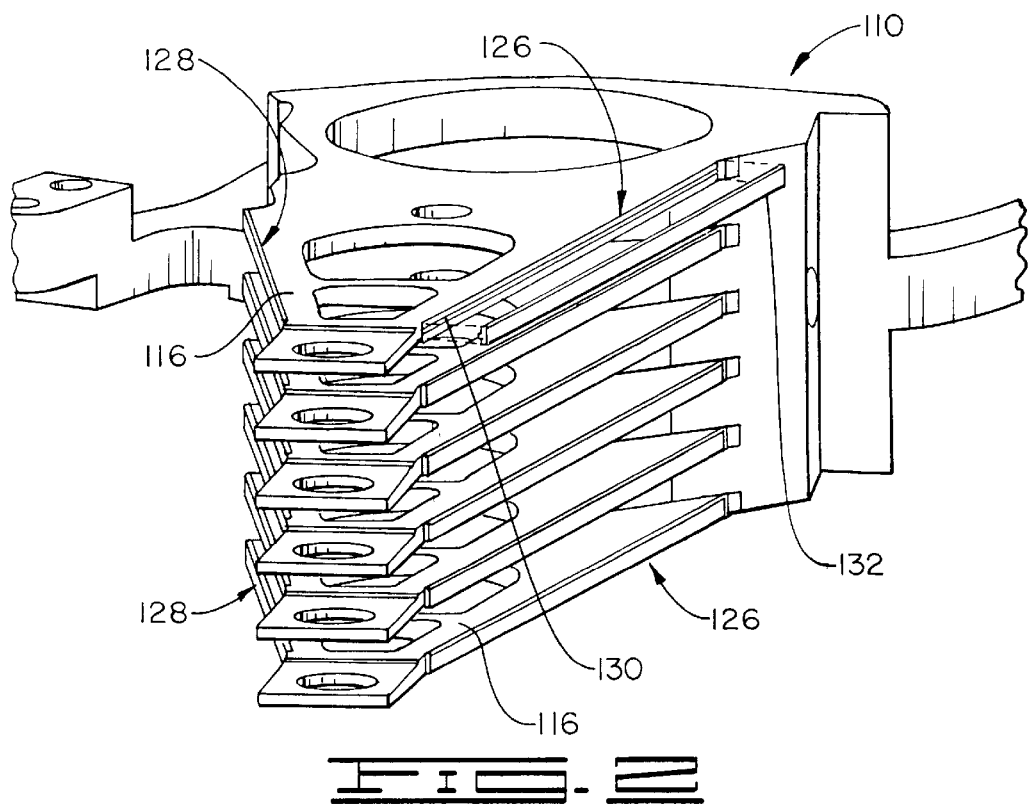
FIG. 2 is a perspective view of an actuator assembly constructed in accordance with a preferred embodiment of the present invention.

Referring now to FIG. 2, shown therein is a perspective view of an actuator assembly 110 which is constructed in accordance with a preferred embodiment of the present invention. For the purpose of clarity, certain parts of the actuator assembly 110, such as the flexure assemblies 118 and heads 120, have been omitted from FIG. 2. As shown, each of the actuator arms 116 has two side portions 126, 128, which extend along opposing edges of each actuator arm as shown and each of the side portions 126, 128 includes a groove 130 formed therein. The grooves 130 are preferably formed in the side portions 126, 128 by a machining operation.

An actuator arm side rail 132 (hereinafter referred to as a "side rail") engages each of the grooves 130 and changes the mechanical response characteristics of the actuator arms 116, as described further herein. Preferably, each side rail 132 is formed by extruding a selected material into a substantially T-shaped cross section, as perhaps best shown in FIG. 3. However, persons skilled in the art will recognize that side rails 132 constructed in accordance with the present invention can be formed in a variety of ways, such as by machining or casting. The side rails 132 can be formed from a light weight composite material, such as a carbon/fiber composite, or from any other suitable material which provides the desired properties, as discussed further below.

Figures 3, 4:
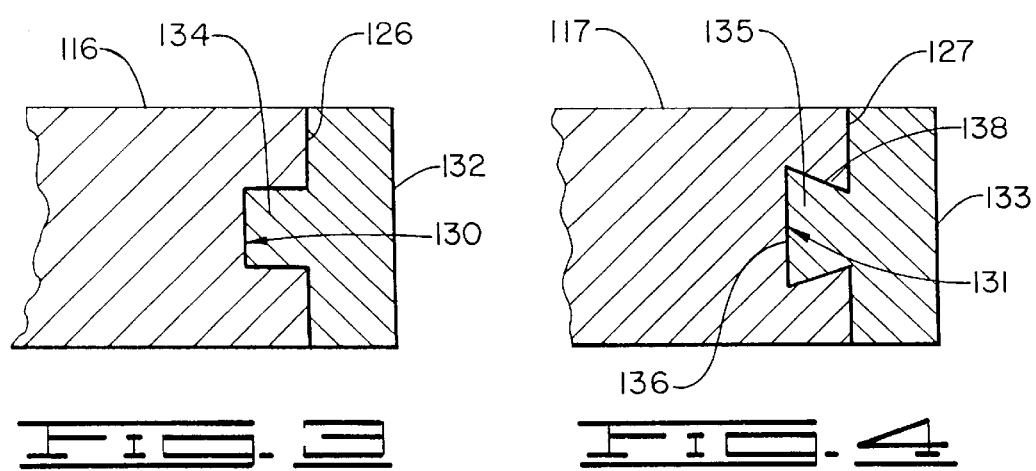
FIG. 3 is a cross-sectional side view of an actuator arm constructed in accordance with the preferred embodiment of FIG. 2.
FIG. 4 is a cross-sectional side view of an alternative embodiment of an actuator arm constructed in accordance with the present invention.

As shown in FIG. 3, in the preferred embodiment, a portion of each side rail 132 forms a tongue or appendage 134 which mates with the corresponding groove 130 in a tongue and groove relationship. The side rails 132 can be fixedly attached to the side portions 126, 128 of the actuator arms 116, such as by using a suitable adhesive.

In an alternative embodiment, as shown in FIG. 4, the appendage 135 on the side rail 133 is appropriately shaped to provide a locking engagement with the groove 131 in the side portion 127 of the actuator arm 117. As shown in FIG. 4, appendage 135 is slightly thicker at its distal end 136 than at its proximal end 138, allowing the appendage 135 to "snap" into engagement with the groove 131 on the actuator arm 127. In another embodiment (not shown), the appendage includes a detent or bulbous portion at its proximal end which allows the side rail to similarly snap into engagement with the groove. Other suitable shapes for the side rail and groove will be readily recognized by those skilled in the art, all of which are within the spirit and scope of the present invention. It will be understood that all references hereinafter to the reference numerals of the preferred embodiment are equally applicable to these alternative embodiments.

As will be recognized, the side rails 132 advantageously change the mechanical response characteristics of the actuator assembly 110 so as to minimize damage to the disc drive 100. As explained in greater detail below, careful selection of the material from which the side rails 132 are constructed allows the actuator arms 116 to be designed to provide particular types of mechanical response characteristics, for example stiffening or damping characteristics.

FIG. 5 is a graphical representation of the wavefunctions for the oscillation of the discs 106 and prior art actuator arms upon encountering a typical non-operational shock. The actuator arms wavefunction 140 and the discs wavefunction 142 are each plotted as a function of time on the X-axis 144 and a function of displacement on the Y-axis 146. Note that the wavefunctions 140, 142 have different frequencies of oscillation. The larger the difference between the two wavefunctions for a given time, the more likely it is that there will be contact between the discs 106 and the heads 120 or actuator arms 116. For instance, at time $T_1$ on the X-axis 144 the magnitude of the displacement of the actuator arms 116 is large in the positive direction, while the magnitude of the displacement of the discs 106 is large in the negative direction. This indicates that the actuator arms 116 and discs 106 are moving toward each other, which is when contact between the actuator arms 116 and discs 106 is most likely to occur. If the amplitude of the displacement is large enough, the actuator arms 116 and discs 106 will contact, and the larger the amplitude of displacement, the greater the force of the contact.

Generally, the side rail 132 will be constructed of a material which will provide increased stiffness to the actuator arms 116. FIG. 6 is a graphical representation of the wavefunctions for the oscillation of the discs 106 and actuator arms 116 upon encountering a typical non-operational shock where the side rails 132 have been constructed using a stiffening material in accordance with the present invention. The actuator arms wavefunction 148 and the discs wavefunction 142 are each plotted as a function of time on the X-axis 150 and a function of displacement on the Y-axis 152. As shown graphically in FIGS. 5 and 6, the increased stiffness of the actuator arms 116 resulting from the side rails 132 decreases the amplitude of the displacement of the actuator arms 116 resulting from a non-operational shock to the disc drive 100. This decrease in the amplitude of the displacement of the actuator arms 116 decreases the likelihood that the heads 120 or actuator arms 116 will contact the surface of the discs 106 and, at a minimum, reduces the amplitude of the force of impact with the discs 106, as can be seen from a comparison of $T_2$ of FIG. 6 and $T_1$ of FIG. 5. Persons skilled in the art will recognize that the side rails 132 also provide increased stiffness to the actuator arms 116 in the X–Z plane, thereby improving the performance of the actuator arms 116 during a seek operation.

Alternatively, the side rails 132 can be constructed from a somewhat softer material designed to provide damping characteristics to the side rails 132, and such characteristics are in turn imparted to the actuator arms 116. FIG. 7 is a graphical representation of the wavefunctions for the oscillation of the discs 106 and actuator arms 116 upon encountering a typical non-operational shock where the side rails 132 have been constructed using a damping material in accordance with the present invention. The actuator arms wavefunction 154 and the discs wavefunction 142 are each plotted as a function of time on the X-axis 156 and a function of displacement on the Y-axis 158. As shown graphically in FIGS. 5 and 7, damping of the actuator arms 116 decreases the frequency of oscillation of the actuator arms 116, thereby decreasing the number of contacts between the discs 106 and actuator arms 116 or heads 120 for any given non-operational shock. Although the initial amplitude of the actuator arm wavefunction may not be decreased, the amplitude is quickly diminished thereafter. This reduces the amplitude of the force of impact with the discs 106, as can be seen from a comparison of $T_1$ of FIG. 5 and $T_3$ of FIG. 7.

Ideally, in accordance with the present invention the properties of the material used to extrude the side rails 132 can be carefully selected so that the actuator arms 116 and discs 106 have the same frequency of oscillation. FIG. 8 is a graphical representation of the wavefunctions for the oscillation of the discs 106 and actuator arms 116 upon encountering a typical non-operational shock where the side rails 132 have been constructed of a material designed to "tune" the frequency of the actuator arms 116 to the frequency of the discs 106. The actuator arms wavefunction 160 and the discs wavefunction 142 are each plotted as a function of time on the X-axis 162 and a function of displacement on the Y-axis 164. Such "tuning" of the actuator arms 116 can be used to eliminate contact between the actuator arms 116 and discs 106 because the actuator arms 116 and the discs 106 move in unison (i.e., at the same frequency), as shown in FIG. 8.

Accordingly, in view of the foregoing discussion it will be clearly understood that the present invention is directed to an apparatus for minimizing damage to a disc drive (such as 100) as a result of the application of a mechanical shock to the drive, the apparatus including an actuator arm (such as 1 16) having a side portion (such as 126 or 128) and a side rail (such as 132) attached to the side portion, the side rail changing the mechanical response characteristics of the actuator arm so as to minimize damage resulting from contact between the actuator arm and a disc (such as 106) of the disc drive.

It will be clear that the present invention is well adapted to attain the ends and advantages mentioned as well as those inherent therein. While presently preferred embodiments have been described for purposes of disclosure, numerous changes may be made which will readily suggest themselves to those skilled in the art and which are encompassed in the spirit of the invention disclosed and as defined in the appended claims.

What is claimed is:

1. An actuator assembly in a disc drive, comprising:
   an actuator arm having a pair of side portions which extend along opposing edges of the actuator arm, the actuator arm disposed adjacent a rigid disc having a disc surface and a characteristic disc frequency of oscillation comprising a frequency at which the disc surface is displaced in response to the mechanical shock; and
   a pair of opposing side rails affixed to the respective side portions of the actuator arm and selectively configured to change mechanical displacement characteristics of the actuator arm to reduce damage to the disc drive resulting from contact between the actuator assembly and the disc surface upon encountering a mechanical shock to the disc drive, wherein the side rails are selectively configured to provide the actuator arm with a characteristic arm frequency of oscillation comprising a frequency at which the actuator arm is displaced in response to the mechanical shock, and wherein the arm frequency of oscillation nominally matches the disc frequency of oscillation.

2. The actuator assembly of claim 1 wherein each of the side portions of the actuator arm includes a groove which extends along the respective edge of the actuator arm.

3. The actuator assembly of claim 2 wherein each of the side rails is elongated and substantially T-shaped and wherein each of the side rails mates with the groove of the respective edge of the actuator arm.

4. The actuator assembly of claim 1 wherein each of the side rails is made from a stiffening material to decrease amplitude of displacement of the actuator arm in response to the mechanical shock.

5. The actuator assembly of claim 1 wherein each of the side rails is made from a dampening material to decrease a frequency of oscillation of the actuator arm in response to the mechanical shock.

6. A disc drive, comprising:
   a base deck;
   a spindle motor mounted to the base deck and having a central axis;
   a rigid disc mounted to the spindle motor for rotation about the central axis, the disc having a disc surface and a characteristic disc frequency of oscillation comprising a frequency at which the disc is displaced in response to the mechanical shock; and an actuator assembly mounted to the base deck adjacent the disc and having an actuator axis parallel to the central axis about which the actuator assembly is controllably rotatable, wherein the actuator assembly comprises:

an actuator arm extendable over the disc surface, the actuator arm having a pair of side portions which extend along opposing edges of the actuator arm; and a pair of side rails affixed to the respective side portions of the actuator arm and selectively configured to change mechanical displacement characteristics of the actuator arm to reduce damage resulting from contact between the actuator assembly and the disc surface upon encountering a mechanical shock to the disc drive, wherein the side rails are selectively configured to provide the actuator arm with a characteristic arm frequency of oscillation comprising a frequency at which the actuator arm is displaced in response to the mechanical shock and wherein the arm frequency of oscillation nominally matches the disc frequency of oscillation.

7. The disc drive of claim 6 wherein each of the side portions of the actuator arm includes a groove which extends along the respective edge of the actuator arm.

8. The disc drive of claim 7 wherein each of the side rails is elongated and substantially T-shaped and wherein each of the side rails mates with the groove of the respective edge of the actuator arm.

9. The disc drive of claim 6 wherein the side rail is made from a stiffening material to decrease amplitude of displacement of the actuator arm in response to the mechanical shock.

10. The disc drive of claim 6 wherein the side rail is made from a dampening material to decrease a frequency of oscillation of the actuator arm in response to the mechanical shock.

* * * * *